United States Patent
Arrowood et al.

(10) Patent No.: US 9,697,825 B2
(45) Date of Patent: Jul. 4, 2017

(54) AUDIO RECORDING TRIAGE SYSTEM

(71) Applicant: Nexidia Inc., Atlanta, GA (US)

(72) Inventors: Jon A. Arrowood, Smyrna, GA (US); Robert William Morris, Decatur, GA (US); Mark Reich, Sandy Springs, GA (US)

(73) Assignee: NEXIDIA INC., Atlanta, GA (US)

( * ) Notice: Subject to any disclaimer, the term of this patent is extended or adjusted under 35 U.S.C. 154(b) by 0 days.

(21) Appl. No.: 14/680,138

(22) Filed: Apr. 7, 2015

(65) Prior Publication Data

US 2016/0300565 A1    Oct. 13, 2016

(51) Int. Cl.
 *G10L 15/08* (2006.01)
 *G10L 25/27* (2013.01)

(52) U.S. Cl.
 CPC ............ *G10L 15/08* (2013.01); *G10L 25/27* (2013.01); *G10L 2015/088* (2013.01)

(58) Field of Classification Search
 USPC ............... 704/231, 235, 236, 243, 244, 251
 See application file for complete search history.

(56) References Cited

U.S. PATENT DOCUMENTS

| | | | |
|---|---|---|---|
| 7,640,161 B2 | 12/2009 | Morris et al. | |
| 2002/0049587 A1* | 4/2002 | Miyazawa | G10L 15/20 704/233 |
| 2006/0212295 A1* | 9/2006 | Wasserblat | G10L 25/48 704/252 |
| 2016/0019882 A1* | 1/2016 | Matula | G10L 15/187 704/254 |

* cited by examiner

*Primary Examiner* — Barbara Reinier
(74) *Attorney, Agent, or Firm* — Pearl Cohen Zedek Latzer Baratz LLP

(57) ABSTRACT

A method for analysis of a set of media recordings includes, in a first processing stage, selecting a subset of the set of media recordings by performing a first processing of each media recording of the set of media recordings and in a second processing stage, performing a second processing of the subset of the set of media recordings, the second processing including extraction of information from the media recordings of the subset of the set of media recordings. The first processing of each media recording of the set of media recordings includes determining a characterization of the media recording, the characterization including at least a quantity characterizing a predicted performance of the second processing of the media recording.

25 Claims, 5 Drawing Sheets

AUDIO RECORDING TRIAGE SYSTEM

BACKGROUND

This invention relates to a system for triage of audio recordings for processing by a speech analytics system.

Speech analytics systems extract information about speech content present in audio data. Some exemplary types of information include topical information, locations and percentages of speech vs. non-speech data, an emotional character of the speech, and so on.

Speech analytics systems are conventionally implemented as software running on general purpose computers. Due to limitations of the current state of the art in general purpose computing, such computers have a limited processing capacity. Given large amounts of audio data (e.g., a large number of audio recordings), a general purpose computer may be unable to process all of the audio data within an acceptable period of time. For this reason, conventional speech analytics systems may choose a sampling (e.g., a random sampling) of the audio data for analysis. The amount of audio data in the sampling is chosen such that it matches or is less than the processing capacity of the general purpose computer.

While such a sampling effectively reduces the amount of data processed by the computer to a manageable level, it does not take into account the quality of the audio data in the sample. For example, in a large number of audio recordings, some recordings may have characteristics which allow for extraction of more information (i.e., provide higher recall) when processed by the speech analytics system than others. Randomly sampling the large number of audio recordings may result in a number of low recall recordings being included in the sample while a number of high recall recordings are excluded from the sample. Including low recall recordings in the sample while excluding high recall recordings can result in a sub-optimal performance of the speech analytics system.

SUMMARY

In an aspect, in general, a method for analysis of a set of media recordings includes, in a first processing stage, selecting a subset of the set of media recordings by performing a first processing of each media recordings of the set of media recordings, and in a second processing stage, performing a second processing of the subset of the set of media recordings, the second processing including extraction of information from the media recordings of the subset of the set of media recordings, wherein the first processing of each media recording of the set of media recordings includes determining a characterization of the media recording, the characterization including at least a quantity characterizing a predicted performance of the second processing of the media recording.

Aspects may include one or more of the following features.

Determining the characterization of the media recording may include determining a degree of presence of each acoustic pattern of a number of acoustic patterns in an audio content of the media recording and processing the determined degree of presence of each acoustic pattern of the number of acoustic patterns in the audio content of the media recording using a model for determining the characterization of the media recording based on the degree of presence of each acoustic pattern of a number of acoustic patterns in the audio content of the media recording.

The model may include a linear support vector machine model. Each acoustic pattern of the number of acoustic patterns may include a phoneme sequence. The degree of presence of each acoustic pattern of the number of acoustic patterns may include a number of occurrences of each acoustic pattern in the audio content of the media recording. The degree of presence of each acoustic pattern of the number of acoustic patterns may include a continuous time likelihood of occurrence of each acoustic pattern in audio content of the media recording.

Selecting the subset of the set of media recordings may include, for each media recording of the set of media recordings, applying a threshold to the quantity characterizing the predicted performance of the second processing of the media recording and selecting the media recording according to a result of applying the threshold. The quantity characterizing the predicted performance may be based on one or both of a desired computation time and a predicted information extraction speed. The quantity characterizing the predicted performance is based on a predicted automatic speech recognition accuracy.

Selecting the subset of the set of media recordings may include choosing a predetermined number of media recordings with the highest quantities characterizing the predicted performance of the second processing of the media recordings.

The quantity characterizing the predicted performance of the second processing of the media recording may represent a measure of a presence of one or more speakers in the media recording.

The quantity characterizing the predicted performance of the second processing of the media recording may represent a predicted amount of extractable information in the media recording. The quantity characterizing the predicted performance of the second processing of the media recording may represent a predicted information extraction speed. The quantity characterizing the predicted performance of the second processing of the media recording may represent a predicted accuracy of information extraction.

The information extracted from the media recordings of the subset of the set of media recordings may include business metric information. The information extracted from the media recordings of the subset of the set of media recordings may include information related to a sentiment of one or more customers associated with one or more media recordings of the subset of the set of media recordings. The information extracted from the media recordings of the subset of the set of media recordings may include a classification of one or more media recordings of the subset of the set of media recordings into one or more media recording categories. The information extracted from the media recordings of the subset of the set of media recordings may include a measure of a performance of a customer service agent associated with one or more of the media recordings of the subset of the set of media recordings. The information extracted from the media recordings of the subset of the set of media recordings may include speech analytics information.

In another aspect, in general, software stored in a non-transitory form on a computer-readable medium, for analysis of a set of media recordings, includes instructions for causing a computing system to, in a first processing stage, select a subset of the set of media recordings by performing a first processing of each media recording of the set of media recordings and in a second processing stage, perform a second processing of the subset of the set of media recordings, the second processing including extraction of information from the media recordings of the subset of the set of media recordings. The first processing of each media recording of the set of media recordings includes determining a characterization of the media recording, the characterization including at least a quantity characterizing a predicted performance of the second processing of the media recording.

In another aspect, in general, a computing system for analysis of a set of media recordings includes at least one processor configured to process the set of media recordings. The processing includes, in a first processing stage, selecting a subset of the set of media recordings by performing a first processing of each media recording of the set of media recordings and in a second processing stage, performing a second processing of the subset of the set of media recordings, the second processing including extraction of information from the media recordings of the subset of the set of media recordings. The first processing of each media recording of the set of media recordings includes determining a characterization of the media recording, the characterization including at least a quantity characterizing a predicted performance of the second processing of the media recording.

In another aspect, in general, a method for training a model for use by a media recording analysis system includes processing a number of media recordings and a number of transcripts associated with the number of media recordings to determine an information extraction performance for each of the number of media recordings, selecting a first subset of the number of media recordings based on the determined information extraction performance for each of the number of media recordings, selecting a second subset of the number of media recordings, different from the first subset of the number of media recordings, based on the determined information extraction performance for each of the number of media recordings, determining a degree of presence of a number of search patterns in the media recordings of the first subset of the number of media recordings, determining a degree of presence of the number of search patterns in the media recordings of the second subset of the number of media recordings, and generating a model based on the degree of presence of the number of search patterns in the media recordings of the first subset of the number of media recordings and the degree of presence of the number of search patterns in the media recordings of the second subset of the number of media recordings. The model is configured to process a media recording to determine a quantity for classifying the media recording as belonging to either the first subset of the number of media recordings or the second subset of the number of media recordings.

In another aspect, in general, a method for designating a subset of a number of media recordings for processing by a speech analytics system includes, for each media recording of the number of media recordings, designating the media recording for processing by the speech analytics system based on an analysis of an audio content of the media recording. The analysis includes processing the audio content of the media recording using one or more sets of competing acoustic models, the processing resulting in a winning model for each of the one or more sets of competing acoustic models, and determining whether to designate the media recording for processing by the speech analytics system based on the winning models for each of the one or more sets of competing acoustic models.

As is mentioned above, automatic speech recognition (ASR) is not always run as a transcription service where every single instant in time in a working set of audio recordings requires an ASR hypothesized output. Sometimes, it is run as an information extraction method. For example, finding example calls in a call center where a particular topic was discussed, tracking statistic trends in a dataset, tracking script compliance in call centers, audio monitoring for intelligence purposes, etc. In many of these cases, there is more audio available in the working set than corresponding computational resources to run speech recognition. Metadata can be used to narrow down the working set, but even then the amount of audio for processing can still exceed the capabilities of the computational resources. Due to the remaining excess of audio data, systems often resort to random sampling.

One characteristic of modern speech recognition systems is that not all recordings are equally "transcribable" by the systems. For example, consider two calls made to a call center by the same person that are otherwise identical, except one call is made on a landline in a quiet room, and the other is made on a cell phone on a subway train. Even human perception will find the speech in the second call more difficult to understand than the speech in the first call. Just like human perception, speech recognition systems will have higher error rates on the second call. Furthermore, just like a human will concentrate to hear in difficult audio conditions, the same is true for speech recognition systems. That is, the more challenging the audio, the more potential decoding paths a speech recognition system will need to evaluate. In this case, not only will error rates be higher, but more computation is required as well. For these reasons, in situations where sampling is required, it is beneficial to choose recordings that are easier to transcribe such that more accurate output is generated in less time.

In some examples, it is possible to know whether a speech recognition engine has had success on a recording. For example, during decoding, a speech recognition engine can keep track of an average count of active paths. For easily transcribable audio that statistically has lower error rates, there will be fewer active paths on average. Alternatively, speech recognition systems may analyze average frame likelihoods to see how well the audio matches an acoustic model. A better match generally corresponds to lower error rates. One drawback of using these methods is that they require time consuming decoding to be run (or partially run) in order to make judgments.

Another class of systems is available that do not require running decoding. This class of system involves deriving audio quality measures from the audio signal. For example, time-local signal-to-noise ratio estimates can be generated. Noisier audio can easily be spotted, and put lower in the processing queue. Similar measures exist to detect channel encoding difficulties. This class has the advantage of typically being much lower computation than ASR, so a larger body of audio can be processed than by a full decoding pass.

These methods, however, leave out a potentially important class of measurements. Consider the example of a high quality recording of someone speaking Japanese being in the processing queue for a North American English speech recognition system. While such a recording would be flagged as low quality by a full decoding pass, it would not be detectible by a light-weight signal analysis pass. More generally, speakers with dialects for which the recognizer is not trained fall into this category.

To solve these problems, in one aspect, an audio recording triage system is configured to quickly analyze an audio signal for speech content in addition to noise and channel characteristics. The triage system uses a fast wordspotting engine to estimate the search accuracy of word spotting, which is highly correlated to the accuracy of speech recognition on the recording. The audio recording triage system analyzes a large set of audio recordings using an audio recording classifier to determine which of the audio recordings potentially include the most extractable information. A sampling of the large set of audio recordings, including the audio recordings with the highest potentially extractable information, is selected and provided to a speech analytics system for processing. In this way, the capacity of the speech analytics system is not wasted on audio recordings with low potential for extractable information.

In some aspects, a set of transcribed audio recordings that are disjoint from any media that was used to develop the word spotting system is used to create a small word spotting evaluation of the audio recordings. Given this set of recordings, each with a known word spotting accuracy score, to groups of audio recordings are generated: a "high recall" group and a "low recall" group.

Separately, a set of search terms (or patterns) is then constructed. In general, the set of search terms will have results on any set of media. In some examples, the set of search terms includes short phoneme sequences, for example all two-phoneme sequences in a language, or the most-frequently-occurring three phoneme sequences. This list need not be short. It can range from hundreds to many thousands of sequences.

Each of the audio recordings in the high recall group and the low recall group are then processed to identify each of the search terms. In some aspects, hits for each sequence that are above a threshold are counted for each recording. In other aspects, the continuous-time likelihood of each phrase for each recording is calculated. The result can be viewed as a vector for each recording, where each index of the vector represents one of the search terms selected above.

The vectors from each of the two high recall and low recall groups are then used as input to a machine learning algorithm (e.g., a support vector machine (SVM)). Since the vectors are likely highly-dimensional, a linear SVM is a likely choice for this step. The result is a linear SVM model that can distinguish between the low recall and high recall groups.

After generating the linear SVM model, any new piece of media can be processed by rapidly searching the media for each of the selected phoneme sequences, with results accumulated in a vector. This vector can then be used as input to the linear SVM, and an output one-dimensional score is calculated that represents how close the recording is to belonging to the low recall group or the high recall group. The score is an estimate of how accurate word spotting will likely be on the recording based on a joint observation of the background noise, the channel characteristics, and the words spoken in the recording.

In some examples, the approaches above leverage the fact that the word spotting accuracy for a recording is highly correlated to the ASR accuracy on the same recording. For this reason, the word spotting accuracy estimate can also be viewed as an ASR accuracy estimate.

Embodiments may include one or more of the following advantages.

Using a wordspotting approach advantageously avoids the use of a full language model for predicting words based on grammar rules. Doing so results in a significant boost processing in speed. In some examples, using a wordspotting approach can result in processing at 100 times faster than traditional ASR approaches.

Furthermore, since a word spotting system doesn't use a full language model, it isn't constrained to search for only words in a given language. Indeed, in the approaches described herein, the wordspotting system searches for search patterns such as phoneme sequences.

By using the same training material to train both the wordspotting engine and the automatic speech recognition (ASR) engine of the speech analytics module, the system is advantageously configured to identify not just clean or high-quality audio, but audio that specifically matches the training data used for the ASR engine. This property maximizes the relevance between wordspotting accuracies and ASR accuracies.

Certain approaches described herein are configured to triage subsets of media recordings (e.g., subsets of audio files). Triaging subsets of media recordings is advantageous since within a given media recording, the acoustics may change, the channel may change, the speaker may change, the speaker's language may change, and so on.

Other features and advantages of the invention are apparent from the following description, and from the claims.

DESCRIPTION

1 System Overview

Figure 1:
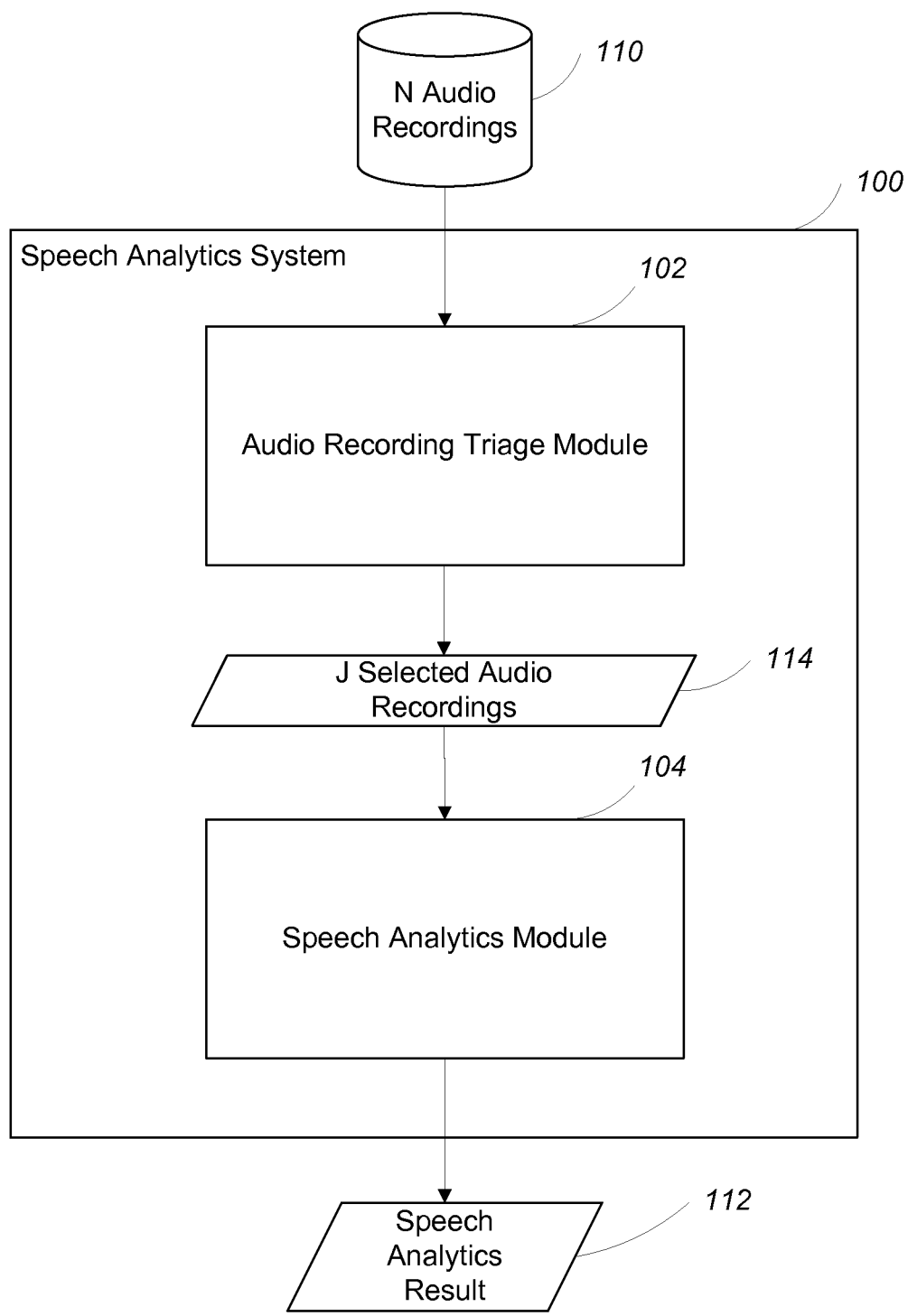
FIG. 1 is a speech analytics system.

Referring to FIG. 1, a speech analytics system 100 receives a number (N) of audio recordings 110 as input and processes at least some of the audio recordings 110 to generate a speech analytics result 112. In some examples, each audio recording corresponds to an audio file. However, in general, the term 'audio recording' can refer to any segment of recorded audio including entire audio files and subsets of one or more audio files. The speech analytics system 100 includes an audio recording triage module 102 for selecting a number of the audio recordings and a speech analytics module 104 for processing the selected audio recordings to generate the speech analytics result 112.

In general, the number of audio recordings 110 may include a large number of audio recordings which the speech analytics module 104 is incapable of processing within an allotted or desired amount of time (e.g., at least 60,000 audio files or 10,000 hours of audio per day). To reduce the number of recordings to be processed by the speech analytics module 104, the audio recordings 110 are first passed to the audio recording triage module 102 which selects J audio recordings 114 of the N audio recordings 110 for processing by the speech analytics module 104. In general, the audio recording triage module 102 is configured to select the J audio recordings 114 such that the selected recordings are likely to have "high recall" in that they have characteristics indicating that a large amount of information can be extracted from the audio content of the recording by the speech analytics module 104. In some examples, the characteristics of each of the J audio recordings 114 analyzed by the audio recording classifier module 104 include, among other characteristics, an expected accuracy of a result of applying an automatic speech recognition algorithm to the audio recording.

The selected audio recordings 114 are then provided to the speech analytics module 104 for processing. In some examples, the speech analytics module 104 is configured to recognize speech present in the content of the audio recordings (e.g., using a speech recognition engine (not shown) such as a wordspotting engine, a large vocabulary continuous speech recognition (LVCSR) engine, or a direct phrase recognition engine) and to automatically extract useful information from the recognized speech. For example, the speech analytics module 104 may extract information related to a topic of discussion, a tone of the discussion, a ratio of speech to non-speech portions of an audio recording, and so on.

In some examples, information is extracted by joining phrases recognized in an audio recording (e.g., by using automatic speech recognition or wordspotting techniques) by Boolean operators and/or temporal operators. A threshold is applied to the joined phrases to determine whether to classify the audio recording as belonging to a given category (e.g., was a particular rebooting problem with a set top box discussed in the audio recording). In other examples, automatic speech recognition or wordspotting techniques can be used to identify phrases that indicate wither a script is being followed or whether undesired (and potentially malicious) behavior is occurring in the audio recording. In some examples, automatic speech recognition or wordspotting techniques can be used to identify phrases (tens to hundreds of phrases) for the purpose of estimating customer sentiment. In yet other examples, audio recordings are processed using automatic speech recognition techniques to generate a text output which can be used as input to machine learning engines in order to predict business metrics such as customer attrition propensity.

Since the number (J) of audio recordings in the J selected audio recordings 114 is typically substantially less than the original number (N) of audio recordings 110, the speech analytics module 104 is capable of processing all of the audio recordings in a desired or allotted amount of time. Furthermore, since the J selected audio recordings 114 are determined to have "high recall," the resulting speech analytics 112 output from the speech analytics module 104 are of a higher quality than results obtained by simply processing a random sampling of the N audio recordings 110 using the speech analytics module 104.

Figure 2:
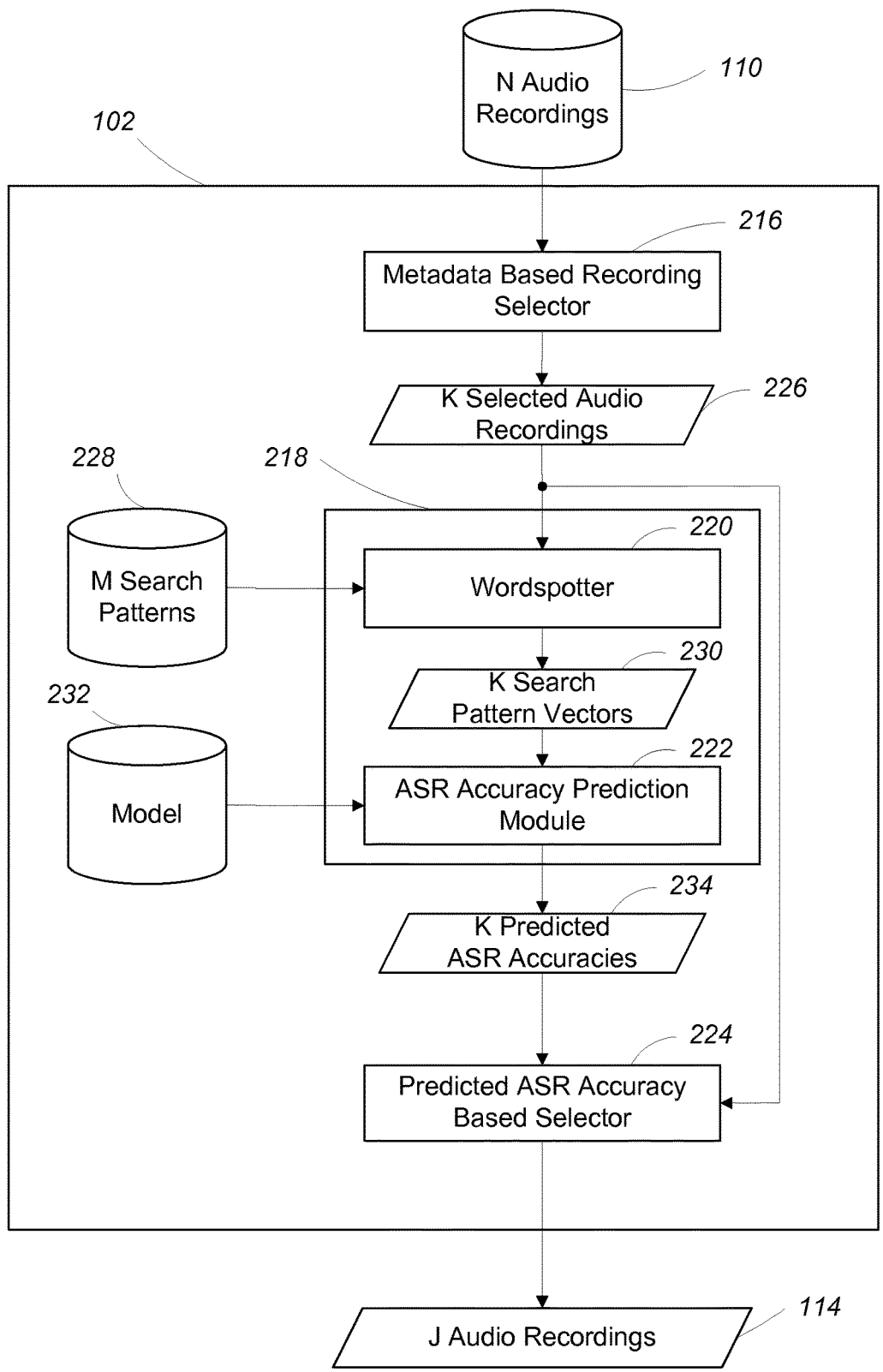
FIG. 2 is a first audio recording triage module.

2 Audio Recording Triage Module 2.1 Search Pattern Based Audio Recording Triage Module Referring to FIG. 2, in some examples, the audio recording triage module 102 receives the N audio recordings 110 as input and processes the N audio recordings to select J audio recordings 114 with predicted high automatic speech recognition (ASR) accuracy (i.e., J audio recordings with predicted "high recall"). The audio recording triage module 102 includes a metadata based recording selector 216, a predicted ASR accuracy evaluation module 218, and a predicted ASR accuracy based audio recording selector 224. The ASR accuracy prediction evaluation module 218 includes a wordspotter 220 and an ASR accuracy predictor 222.

In operation of the audio recording triage module 102, the N audio recordings 110 are first provided to the metadata based recording selector 216. The metadata based recording selector 216 analyzes the metadata of the N audio recordings 110 to select K audio recordings 226 (i.e., a subset of the N audio recordings 110) based on information included in their associated metadata. In some examples, the information included in the metadata of the audio recordings includes a duration of the audio recording, a phone number associated with the audio recording, an account number and/or type associated with the audio recording, a time that the audio recording was recorded, a customer service agent identifier, a call queue identifier (e.g., a billing queue or a repair queue), account information such as account balance and customer tenure, and so on. In general, the K selected audio recordings 226 include only recordings that are determined to be relevant based on a metadata criteria specified, for example, by an operator of the speech analytics system 100.

The K selected audio recordings 226 are then provided to the predicted ASR accuracy evaluation module 218 which processes each of the K selected audio recordings 226 to determine a predicted ASR accuracy for the recording.

To determine the predicted ASR accuracy for the K selected audio recordings 226, the K selected audio recordings 226 are first provided to the wordspotter 220 along with a set of M search patterns 228. In some examples, the wordspotter 220 uses techniques described in U.S. Pat. No. 7,640,161, titled "Wordspotting System," filed May 14, 2007, the contents of which are incorporated herein by reference. As is described in greater detail below, in some examples, the set of M search patterns includes M short phoneme sequences, for example all two-phone sequences in a language, or the most-frequently-occurring three phoneme sequences in a language. In some examples, the number (M) of search patterns can range from hundreds to many thousands.

The wordspotter 220 searches each of the audio recordings to identify instances of each of the M search patterns 228 in the audio recordings. The identified instances of the M search patterns 228 in the audio recordings are used to determine a measure of how often each search pattern occurs or how likely the search pattern is to occur in each of the audio recordings. In some examples, for each search pattern of the M search patterns 228, the wordspotter 220 maintains a count of a number of instances of the search pattern identified in each audio recording. In other examples, for each search pattern of the M search patterns 228, the wordspotter 220 integrates the continuous-time likelihood of the search pattern for each audio recording. The output of the wordspotter 220 includes K search pattern vectors 230 (i.e., one search pattern vector for each audio recording), each search pattern vector including M entries (i.e., one entry for each of the M search patterns). In general, each entry of each of the vectors includes a measure of how often a given search pattern occurs or how likely the given search pattern is to occur in a given audio recording.

The K search pattern vectors 230 are provided to the ASR accuracy prediction module 222 which uses a model 232 to generate K predicted ASR accuracy measures 234 (i.e., a predicted ASR accuracy measure for each of the K selected audio recordings 226). In general, each predicted ASR accuracy measure is an estimate of how accurate wordspotting and/or ASR will likely be on the recording based on a joint observation of the background noise, the channel characteristics, and the words spoken in the recording. In some examples, the predicted ASR accuracy for a recording can be represented numerically (e.g., on a 0 to 1 scale, where 0 represents the lowest predicted ASR accuracy and 1 represents the highest predicted ASR accuracy).

In some examples, the ASR accuracy prediction module 222 is a linear state vector machine (SVM) predictor and the model 232 is a linear SVM model. One example of a method for generating the model 232 is described in greater detail below, with reference to FIG. 3.

The K predicted ASR accuracy measures 234 are provided to the predicted ASR accuracy based audio recording selector 224 along with the K selected audio recordings 226. The predicted ASR accuracy based audio recording selector 224 selects the J audio recordings with the highest predicted ASR accuracies from the K selected audio recordings 226 and outputs the J audio recordings 114. In some examples, J is a predetermined, fixed number less than or equal to K. In other examples, the predicted ASR accuracy based audio recording selector 224 applies a predicted accuracy threshold to the K predicted ASR accuracy measures 234 and the value of J changes based on a number of audio recordings having a predicted ASR accuracy measure above the threshold.

In some examples, rather than being based on a predicted accuracy, the threshold is based on a desired computation time and the predicted information extraction speed of the media recordings and the value of J changes based on a number of audio recordings that can be processed in a time interval related to the threshold.

The J predicted high ASR accuracy audio recordings 114 are then passed out of the audio recording triage module 102 to the speech analytics module 104 as is described above in reference to FIG. 1.

2.1.1 Model Generation

Figure 3:
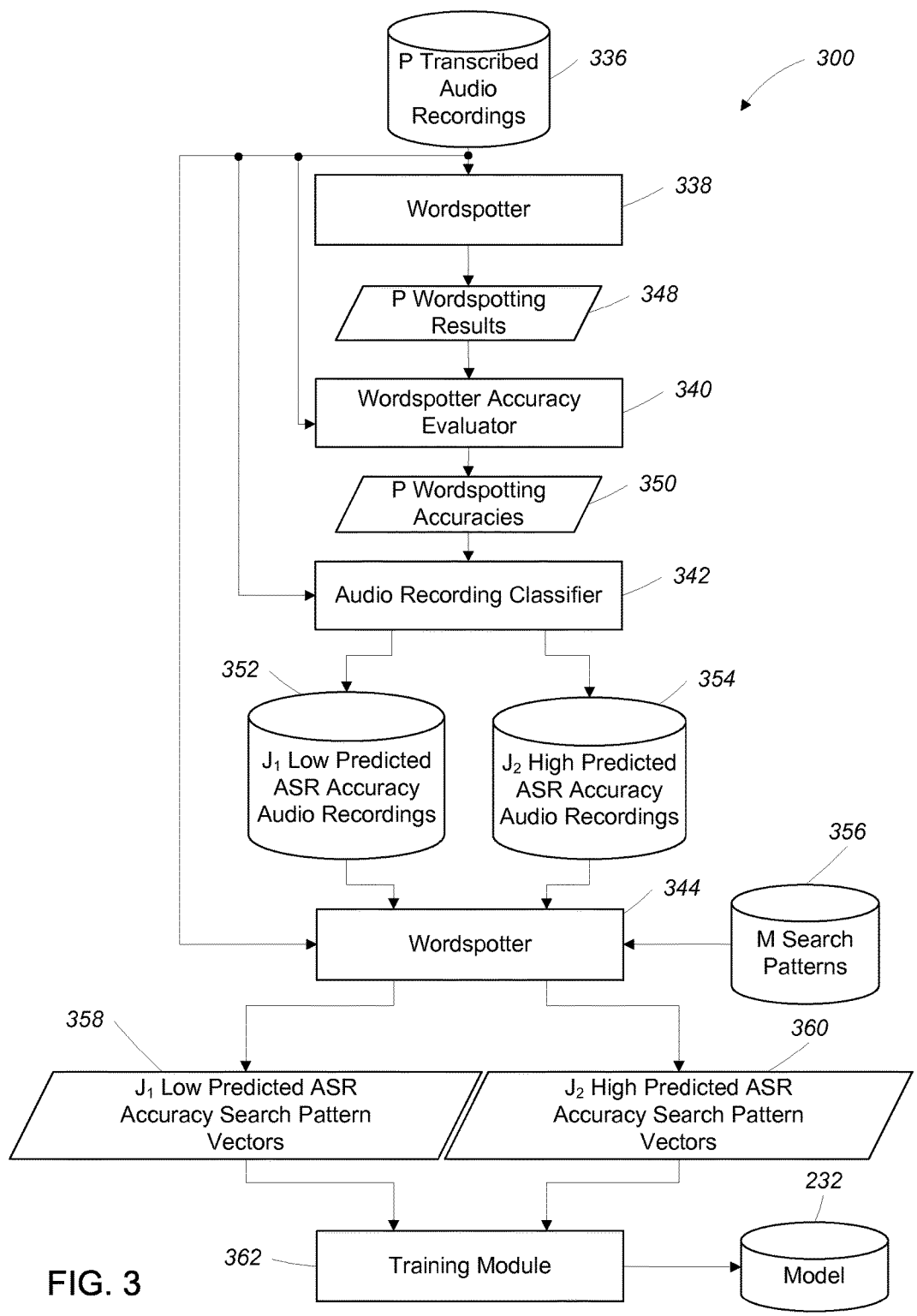
FIG. 3 is a model generation system.

Referring to FIG. 3, a model generation system 300 receives a number (P) of transcribed audio recordings 336 and processes the P transcribed audio recordings to generate the model 232 used in the audio recording triage module 102 of FIG. 2. In general, the P transcribed audio recordings 336 are assumed to be correctly transcribed, are disjoint from any media that was used to develop or train the wordspotters 338, 344, and represent a wide variety of speakers, background noise conditions, and channel conditions.

The model generation system 300 includes a first wordspotter 338, a wordspotting accuracy evaluator 340, an audio recording classifier 342, a second wordspotter 344, and a training module 346. Note that, in general, one single wordspotter may be re-used rather than using two separate wordspotters. However, for the sake of simplifying the description of the model generation system 300, the wordspotter is represented as two separate elements in FIG. 3.

In operation, the P transcribed audio recordings 336 are provided to the first wordspotter 338. In some examples, the first wordspotter 338 performs a small wordspotting evaluation on each of the P transcribed audio recordings 336. For example, the first wordspotter 338 may select one or more sections of the transcript for each audio recording and then search the audio recording to identify instances of the selected sections of the transcript in the audio recording. The wordspotter generates P wordspotting results 348 (i.e., one wordspotting result for each of the P transcribed audio recordings) and provides the P wordspotting results 348 to the wordspotting accuracy evaluator 340 along with the P transcribed audio recordings 336.

For each wordspotting result (of the P wordspotting results 348) for a transcribed audio recording (of the P transcribed audio recordings 336), the wordspotting accuracy evaluator 340 compares the wordspotting result to the transcript associated with the transcribed audio recording to evaluate how well the wordspotter was able to correctly detect words in the selected sections of the transcript in the audio recording. The output of the wordspotting accuracy evaluator 340 includes P wordspotting accuracies 350. In some examples, each of the P wordspotting accuracies 350 is represented as a percentage of successfully identified selections of the transcript in the audio recording.

In general, no two of the P transcribed audio recordings 110 are likely to share enough mutual phrases to allow a single test to be run across all recordings. Thus, the above described process is essentially a recording-specific accuracy self test.

The P wordspotting accuracies 350 and the P transcribed audio recordings 336 are provided to the audio recording classifier 342 which groups at least some of the P transcribed audio recordings 336 into a first group of $J_1$ audio recordings with a low predicted ASR accuracy 352 (i.e., low recall recordings) and into a second group of $J_2$ audio recordings with a high predicted ASR accuracy 354 (i.e., high recall recordings) based on the P wordspotting accuracies 350. In some examples, the first group of audio recordings with a low predicted ASR accuracy 352 is determined by applying a threshold to the P wordspotting accuracies 350 and including any of the P transcribed audio recordings with wordspotting accuracies below the threshold in the first group 352. For example, the first group 352 may include any audio recordings of the P transcribed audio recordings 336 with wordspotting accuracies below 25%. Similarly, in some examples, the second group of audio recordings with a high predicted ASR accuracy 354 is determined by applying a threshold to the P wordspotting accuracies 350 and including any of the P transcribed audio recordings with wordspotting accuracies above the threshold in the second group 354. For example, the second group 354 may include any audio recordings of the P transcribed audio recordings 336 with wordspotting accuracies above 75%.

In some examples, the first group of $J_1$ audio recordings 352 and the second group of $J_2$ audio recordings 354 are selected such that they each have a predetermined size. For example, the first group of $J_1$ audio recordings may include the 100 audio recordings with the lowest predicted ASR accuracy and the second group of $J_2$ audio recordings may include 100 audio recordings with the highest predicted ASR accuracy.

The first group of $J_1$ audio recordings 352, the second group of $J_2$ audio recordings 354, and the M search patterns 356 are provided to the second wordspotter 344 which identifies occurrences of the M search patterns in the audio recordings of the first group of $J_1$ audio recordings 352 and the second group of $J_2$ audio recordings 354. To do so, the second wordspotter 344 searches each of the audio recordings in the first group of $J_1$ audio recordings with a low ASR predicted accuracy 352 to identify instances of each search pattern of the M search patterns 356 in the $J_1$ audio recordings. The second wordspotter 344 uses the identified instances of the M search patterns in the $J_1$ audio recordings with a low predicted ASR accuracy 352 to determine a measure of how often each search pattern occurs or how likely the search pattern is to occur in each of the $J_1$ audio recordings with a low predicted ASR accuracy 352. In some examples, for each search pattern of the M search patterns 356, the second wordspotter 344 maintains a count of a number of instances of the search pattern identified in each of the $J_1$ audio recordings with a low predicted ASR accuracy 352. In other examples, for each search pattern of the M search patterns 356, the second wordspotter 344 integrates the continuous-time likelihood of the search pattern for each of the audio recordings with a low predicted ASR accuracy 352.

The second wordspotter 344 generates $J_1$ low predicted accuracy ASR search pattern vectors 358 (i.e., one search pattern vector for each of the $J_1$ low predicted ASR accuracy audio recordings 352), each search pattern vector including M entries (i.e., one entry for each of the M search patterns 356). As was the case above, in general, each entry of each of the vectors includes a measure of how often a given search pattern occurs or how likely the given search pattern is to occur in a given audio recording.

The second wordspotter 344 also searches each of the audio recordings in the second group of $J_2$ audio recordings with a high ASR predicted accuracy 354 to identify instances of each search pattern of the M search patterns 356 in the $J_2$ audio recordings. The second wordspotter 344 uses the identified instances of the M search patterns in the $J_2$ audio recordings with a high predicted ASR accuracy 354 to determine a measure of how often each search pattern occurs or how likely the search pattern is to occur in each of the $J_2$ audio recordings with a high predicted ASR accuracy 354. In some examples, for each search pattern of the M search patterns 356, the second wordspotter 344 maintains a count of a number of instances of the search pattern identified in each of the $J_2$ audio recordings with a high predicted ASR accuracy 354. In other examples, for each search pattern of the M search patterns 356, the second wordspotter 344 integrates the continuous-time likelihood of the search pattern for each of the $J_2$ audio recordings with a high predicted ASR accuracy 354.

The second wordspotter 344 generates $J_2$ high predicted accuracy ASR search pattern vectors 360 (i.e., one search pattern vector for each of the $J_2$ high predicted ASR accuracy audio recordings 354), each search pattern vector including M entries (i.e., one entry for each of the M search patterns 356). As was the case above, in general, each entry of each of the vectors includes a measure of how often a given search pattern occurs or how likely the given search pattern is to occur in a given audio recording.

The $J_1$ low predicted ASR accuracy search pattern vectors 358 and the $J_2$ high predicted ASR accuracy search pattern vectors 360 are then provided to the training module 362 (e.g., a linear support vector machine training module or another suitable machine learning module) which processes the vectors 358, 360 to generate a model 232 that is capable of distinguishing between audio recordings with low predicted ASR accuracy and audio recordings with high predicted ASR accuracy based on the search pattern vectors for the audio recordings. The model 232 is stored on a machine readable medium for later use (e.g., by the audio recording triage module 102 of FIG. 1).

2.1.2 Search Pattern Generation

Figure 4:
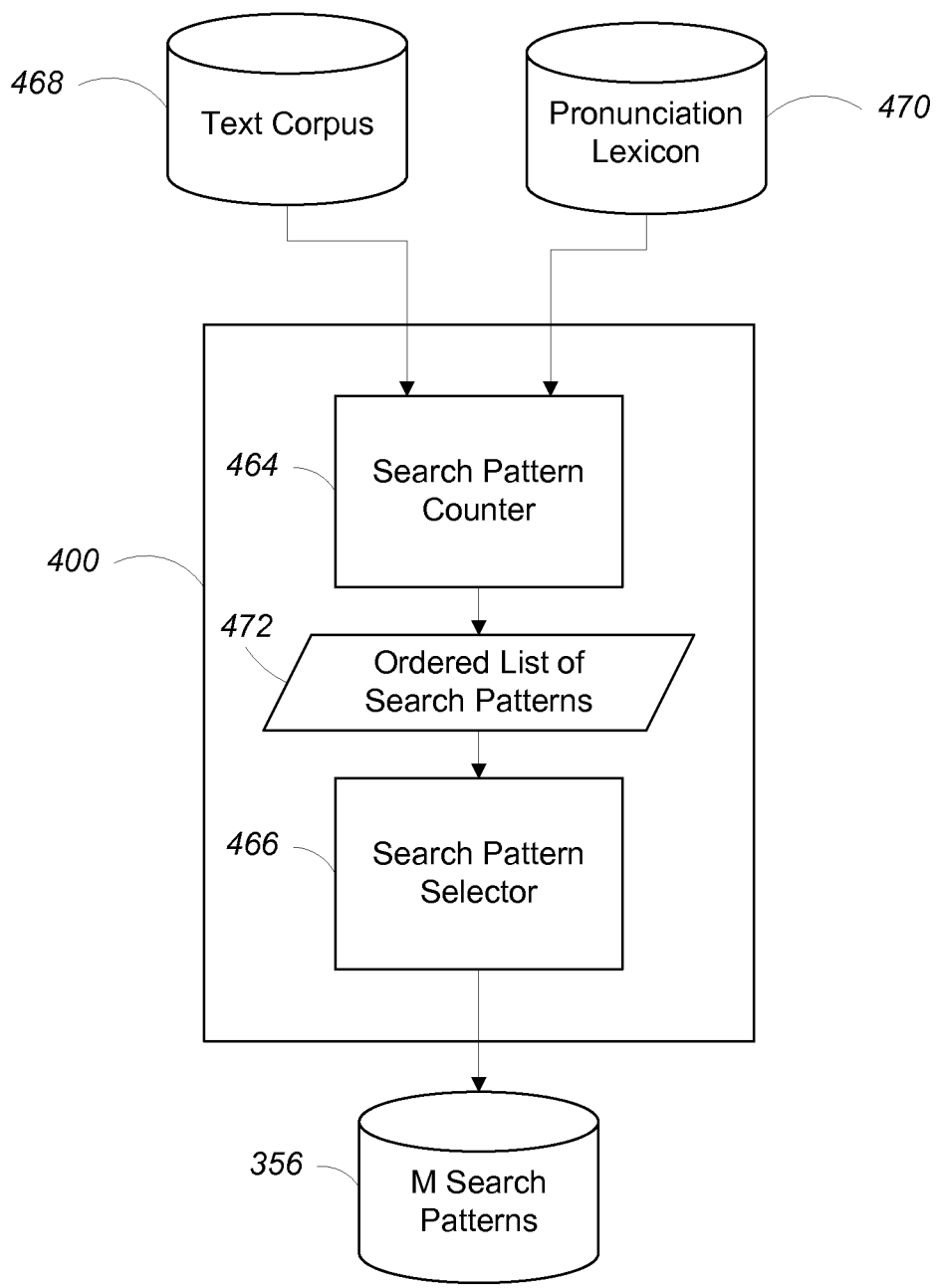
FIG. 4 is a search pattern generation system.

Referring to FIG. 4, in some examples, the M search patterns 356 used by both the audio triage module 102 of FIG. 1 and by the model generation system 300 of FIG. 3 are generated by a search pattern generation system 400. Very generally, the search pattern generation system 400 receives a text corpus 468 and a pronunciation lexicon 470 as input and processes the inputs to generate the M search patterns 356. In some examples, the search pattern generation system 400 includes a search pattern counter 464 and a search pattern selector 466. In some examples, the text corpus 468 includes a large, structured set of texts in a single language (i.e., a monolingual corpus) and the pronunciation lexicon 470 includes a large number of mappings between words of the single language and phoneme-based pronunciations of the words.

In the search pattern generation system 400, the text corpus 468 and the pronunciation lexicon 470 are first provided to the search pattern counter 464 which, in some examples, processes the text corpus 468 to determine a number of occurrences of all short phoneme sequences (e.g., two-phoneme or three-phoneme sequences) of the language in the text corpus 468. In some examples, the search pattern counter 464 first processes the pronunciation lexicon 470 to identify all short phoneme sequences in the language. The search pattern counter 464 then searches the text corpus 468 to determine a number of identified occurrences of the short phoneme sequences in the text corpus 468. The output of the search pattern counter 464 includes a list of the short phoneme sequences 472 ordered by the number of occurrences of the short phoneme sequences in the text corpus 468. For example, the short phoneme sequences in the ordered list of short phoneme sequences 472 may be ranked in descending order based on the number of occurrences of the short phoneme sequences in the text corpus 468 with the most commonly occurring short phoneme sequence at the top of the list 472 and the least commonly occurring short phoneme sequence at the bottom of the list 472.

The ordered list of search patterns 472 is provided to the search pattern selector 466 which selects the M most commonly occurring search patterns from the list 472 and outputs the M selected search patterns as the M search patterns 356. In some examples, the M search patterns 356 includes all of the short phoneme sequences identified by the search pattern counter 464.

2.2 Alternative Triage Approaches

Figure 5:
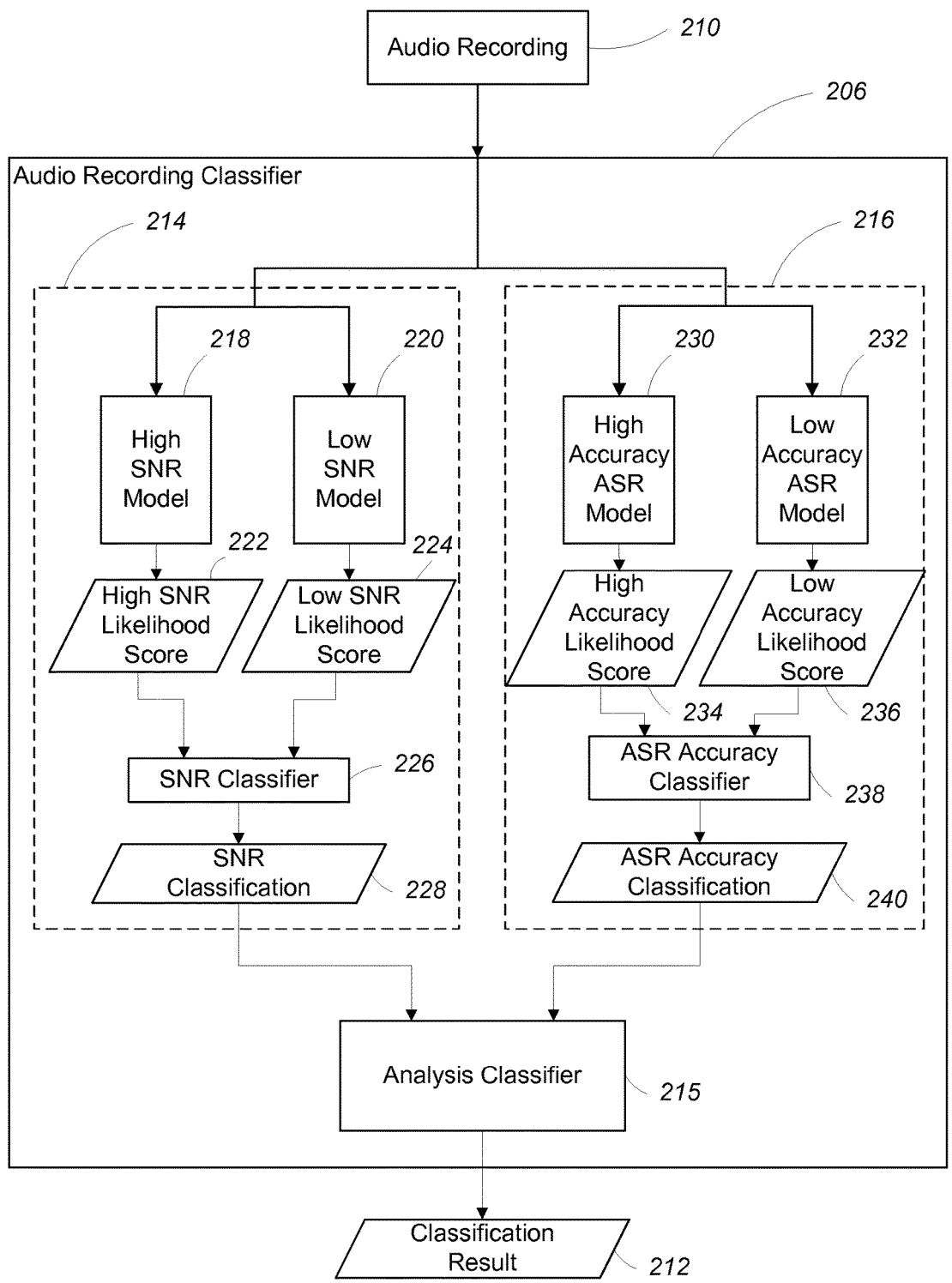
FIG. 5 is an audio recording classifier.

Referring to FIG. 5, in some examples, the audio recording triage module 102 uses a parallel phone recognition (PPR) based audio recording classifier 206. In some examples, the PPR based audio recording classifier 206 is configured to efficiently classify a content of each of the audio recordings into two or more classes (e.g., as being either a "high recall recording" or a "low recall recording"). A high recall recording is a recording which has characteristics indicating that a large amount of information can be extracted from the audio content of the recording by the speech analytics module 104. A low recall recording is a recording which has characteristics indicating that a lesser amount of information can be extracted from the audio content of the recording by the speech analytics module 104.

In this approach, each audio recording 210 of the K selected audio recordings 226 is provided to the audio recording classifier 206 which processes the audio recording 210 to generate a classification result 212. In some examples, the classification result 212 indicates if the audio recording includes sufficiently high quality audio (i.e., is a "high recall" recording) for processing by the speech analytics module 104 or if the audio recording 210 includes low quality audio (i.e., is a "low recall" recording) rendering the recording insufficient for processing by the speech analytics module 104. The audio recording classifier 206 includes two parallel phone recognition (PPR) language identification systems 214, 216 and an analysis classifier 215.

A first PPR language identification system 214 of the two PPR language identification systems is trained to discriminate between audio recordings having a high signal-to-noise ratio and audio recordings having low signal-to-noise ratio. In some examples, the first PPR language identification system 214 includes two competing models (e.g., phone networks): a high SNR model 218 and a low SNR model 220. The high SNR model 218 is trained using training data including a number of audio recordings known to have a high signal-to-noise ratio. The low SNR model 220 is trained using training data including a number of audio recordings known to have a low signal-to-noise ratio.

In operation, the audio recording 210 is provided to both the high SNR model 218 and the low SNR model 220. The high SNR model 218 processes the audio recording 210 to generate a "high SNR likelihood score" 222 representing the likelihood that the audio recording 210 has a high signal-to-noise ratio. The low SNR model 218 processes the audio recording 210 to generate a "low SNR likelihood score" 224 representing a likelihood that the audio recording 210 has a low signal-to-noise ratio. The high SNR likelihood score 222 and the low SNR likelihood score 224 are provided to an SNR classifier 226 which determines the maximum of the two scores 222, 224, and based on the determination, generates an SNR classification 228 which indicates whether audio recording 210 is classified as a high signal-to-noise ratio recording or a low signal-to-noise ratio recording. For example, if the maximum of the two scores 222, 224 for the audio recording 210 is the high SNR likelihood score 222, the SNR classifier 226 will generate an SNR classification 228 indicating that the audio recording 210 is a high signal-to-noise ratio recording.

A second PPR language identification system 216 of the two PPR language identification systems is trained to discriminate between audio recordings having speech content which is expected to produce high accuracy recognition results when processed by an automatic speech recognition (ASR) engine, and audio recordings having speech content which is expected to produce low accuracy recognition results when processed by an automatic speech recognition engine. In some examples, the second PPR language identification system 216 includes two competing models: a high accuracy ASR model 230 and a low accuracy ASR model 232. The high accuracy ASR model 230 is trained using training data including a number of audio recordings which are known to have a high recognition accuracy when processed by an automatic speech recognition algorithm. The low accuracy ASR model 232 is trained using training data including a number of audio recordings which are known to have a low recognition accuracy when processed by an automatic speech recognition algorithm.

In some examples, the training data is obtained by first processing a number of audio recordings using an automatic speech recognition algorithm to generate a recognition result for each of the audio recordings. An accuracy of the recognition result for each of the audio recordings is then evaluated (e.g., manually or by an automatically determined accuracy metric). Each of the audio recordings is then marked as a known high accuracy audio recording or a known low accuracy audio recording depending on the determined recognition accuracy of the audio recording.

In some examples, to generate the high accuracy ASR model 230, audio recordings in the training data that are marked as having high ASR accuracy are processed to identify a number of instances of each possible three-phoneme sequence from a set of phonemes (e.g., a set of 40 phonemes, resulting in a set of 64,000 possible three-phoneme sequences). Each of the three-phoneme sequences, along with the number of identified instances of the three-phoneme sequence, is included in a high ASR accuracy feature vector. The high ASR accuracy feature vector is provided to as input to a training module (e.g., a linear support vector machine training module or another suitable machine learning module) which processes the vector to generate the high ASR accuracy model 232 that is capable of identifying audio recordings with high predicted ASR accuracy based on search pattern vectors for the audio recordings.

To generate the low ASR accuracy model 232, audio recordings in the training data that are marked as having low ASR accuracy are processed to identify a number of instances of each of the possible three-phoneme sequences from the set of phonemes. Each of the three-phoneme sequences, along with the number of identified instances of the three-phoneme sequence, is included in a low ASR accuracy feature vector. The low ASR accuracy feature vector is provided as input to a training module (e.g., a linear support vector machine training module or another suitable machine learning module) which processes the vector to generate the low ASR accuracy model 232 that is capable of identifying audio recordings with high predicted ASR accuracy based on search pattern vectors for the audio recordings.

In operation, the audio recording 210 is processed according to both the high accuracy ASR model 230 and the low accuracy ASR model 232 (e.g. using a support vector machine). The high accuracy ASR model 230 processes the audio recording 210 to generate a "high accuracy likelihood score" 234 representing the likelihood that the audio recording 210 will result in a high accuracy recognition result. The low accuracy ASR model 232 processes the audio recording 210 to generate a "low accuracy likelihood score" 236 representing a likelihood that the audio recording 210 will result in a low accuracy recognition result. The high accuracy likelihood score 234 and the low accuracy likelihood score 236 are provided to an ASR accuracy classifier 238 which determines the maximum of the two scores 234,236, and based on the determination, generates an ASR accuracy classification 240 which indicates whether audio recording 210 is expected to result in a high ASR recognition accuracy or a low ASR recognition accuracy. For example, if the maximum of the two scores 234, 236 for the audio recording 210 is the high accuracy likelihood score 234, the ASR accuracy classifier 238 will generate an ASR accuracy classification 240 indicating that the audio recording 210 is expected to result in a high ASR recognition accuracy.

The SNR classification 228 and the ASR accuracy classification 240 for the audio recording 210 are both provided to the analysis classifier 215 which generates an audio recording classification designating (i.e., classifying) the audio recording 210 as a recording which will or will not be processed by the speech analyzer 104 (i.e., as a high recall recording or as a low recall recording). In some examples, the analysis classifier 215 only designates recordings which are classified has having a high SNR and a high ASR accuracy for further processing by the speech analyzer 104. In other examples, the SNR classification 228 and the ASR accuracy classification 240 may include a score (e.g., a log likelihood ratio) indicating how strongly the audio recording is associated with its classification. In such examples, the analysis classifier 215 may analyze the scores (e.g., by computing a weighted combination of the scores) to decide whether or not the recording associated with the scores is designated for processing by the speech analytics module 104.

3 Alternatives

The techniques described herein can be used in any process flow where there is a high-computation algorithm (ASR in the above scenario) that could benefit by knowing in advance the quality of the speech. Other examples are in queueing recordings where processing all recordings may be necessary, but it may be beneficial to get as many results as fast as possible, and save the difficult recordings until later.

In some examples, the reliability of the systems described herein can be improved by using the same media to train the wordspotting system as was used to train the ASR system. Doing so maximizes the relevance between word spotting accuracies and ASR accuracies.

In some examples, the same training data and phoneme sets that are used to train the two PPR language identification modules are also used to train the speech recognition engine (e.g., the wordspotting engine or other automatic speech recognition engine) in the speech analytics module 104.

In some examples, the entire content of each of the audio recordings is processed by the PPR language identification modules during the triage process. In other examples, only certain segments of the audio recordings are processed by the PPR language identification modules. For example, certain audio recordings having a long duration (e.g., a length between 2 and 60 minutes) typically only include important information in the beginning of the audio recording and at the end of the audio recording. For these recordings, only information-rich beginning and end of the audio recording is processed.

In some examples, the speech analytics system described above runs on a multi-tenant computing system where a cost of computation changes from hour to hour based on the computing load on the system. In such examples, an expected value of the speech analytics result for a given audio recording is estimated. An audio recording is then processed only if its estimated value is greater than the cost of computing its speech analytics result.

In some examples, the value for an audio recording includes non-acoustic metadata such as a "customer value" as well as acoustic variables of interest such as gender, height, and so on. In some examples, an estimated value of a speech analytics result for a segment of an audio recording can also be computed and used as is described above.

In some examples, each of the audio recordings selected by the sample selector are subjected to a further triage step in which a high scoring segment of speech (as determined by the PPR language identification modules) of each of the selected audio recordings is processed using an automatic speech recognition engine. The automatic speech recognition engine performs a full lattice generation for the segment of speech and then applies a forward-backward algorithm on the lattice to calculate an average probability of the top hypothesis. Only those audio recordings with a high average probability associated with their top hypothesis are passed on for analysis by the speech analytics module. In some examples, the audio recordings determined to have a high (and/or low) average probability associated with their top hypothesis are used to create new training data to train the models included in the audio recording classifier. In this way the models of the audio recording classifier can be made to adapt to a particular customer environment.

In other examples, to further improve performance of the speech analytics module, for each audio recording selected by the audio recording triage module, automatic speech recognition is performed on all segments of the entire audio recording. If the lattice generated during the automatic speech recognition process for a given segment of the audio recording becomes too deep, speech recognition for the segment is canceled and the automatic speech recognizer advances to and processes the next segment of the audio recording.

While the above description primarily relates to the application of triage approaches to audio recordings, in general, the approaches can be applied to any types of media recordings which include audio data (e.g., video).

While the M search patterns are described as being phonemes in the above description, in general, other types of search patterns which lend themselves to quantification of a recording's potential to have information extracted therefrom can be used.

Certain approaches described herein are configured to triage subsets of media (e.g., subsets of audio recordings, which may be included in audio files) for the purpose of prioritizing processing of the subsets of media. For example, a single media file might include high noise at the beginning, low noise in the middle, and Japanese spoken language at the end. These approaches still achieve the goal of reducing CPU cost even if the approaches still perform ASR on certain subsets of possibly every file. In some examples, these approaches are implemented by block-processing chunks of media recordings and either using them independently or using a median filter to reduce noisy accuracy-prediction estimates. In some examples, the approaches also identify boundaries within media recordings with different predicted performance of information extraction.

In some examples, approaches configured to triage subsets of media can be used in real-time scanning solutions.

In some examples, the audio recording triage module may also be configured to select audio recordings according to features other than a predicted level of recall. For example, the audio recording triage module may be configured to maintain balance of a given characteristic over certain subsets of the media. For example, in an agent evaluation application in a call center, the audio recording triage module may be configured to ensure that the subset of selected audio recordings includes adequate representation for each agent of a number of agents at the call center.

4 Implementations

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data recordings; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims. Other embodiments are within the scope of the following claims.

What is claimed is:

1. A method for analysis of a set of media recordings, the method comprising:

in a first processing stage, selecting a subset of the set of media recordings by performing a first processing of each media recording of the set of media recordings; and in a second processing stage, performing a second processing of the subset of the set of media recordings, the second processing including extraction of information from the media recordings of the subset of the set of media recordings;

wherein the first processing of each media recording of the set of media recordings includes determining a quantity characterizing a predicted performance of the second processing of the media recording, wherein the quantity represents a predicted extraction speed when extracting information from the media recording.

2. The method of claim 1 wherein each media recording of the set of media recordings includes an audio file.

3. The method of claim 1 wherein determining the predicted performance comprises:

determining a degree of presence of each acoustic pattern of a plurality of acoustic patterns in an audio content of the media recording; and processing the determined degree of presence of each acoustic pattern of the plurality of acoustic patterns in the audio content of the media recording using a model for determining the characterization of the media recording based on the degree of presence of each acoustic pattern of a plurality of acoustic patterns in the audio content of the media recording.

4. The method of claim 3 wherein the model includes a linear support vector machine model.

5. The method of claim 3 where each acoustic pattern of the plurality of acoustic patterns includes a phoneme sequence.

6. The method of claim 3 wherein the degree of presence of each acoustic pattern of the plurality of acoustic patterns includes a number of occurrences of each acoustic pattern in the audio content of the media recording.

7. The method of claim 3 wherein the degree of presence of each acoustic pattern of the plurality of acoustic patterns includes a continuous time likelihood of occurrence of each acoustic pattern in audio content of the media recording.

8. The method of claim 1 wherein selecting the subset of the set of media recordings includes, for each media recording of the set of media recordings, applying a threshold to the quantity characterizing the predicted performance of the second processing of the media recording and selecting the media recording according to a result of applying the threshold.

9. The method of claim 1 wherein the quantity characterizing the predicted performance is based on a desired computation time.

10. The method of claim 1 wherein the quantity characterizing the predicted performance is based on a predicted automatic speech recognition accuracy.

11. The method of claim 1 wherein selecting the subset of the set of media recordings includes choosing a predetermined number of media recordings with the highest quantities characterizing the predicted performance of the second processing of the media recordings.

12. The method of claim 1 wherein the quantity characterizing the predicted performance of the second processing of the media recording additionally represents a predicted accuracy of information extraction.

13. The method of claim 1 wherein the quantity characterizing the predicted performance of the second processing of the media recording additionally represents a measure of a presence of one or more speakers in the media recording.

14. The method of claim 1 wherein the information extracted from the media recordings of the subset of the set of media recordings includes business metric information.

15. The method of claim 1 wherein the information extracted from the media recordings of the subset of the set of media recordings includes information related to a sentiment of one or more customers associated with one or more media recordings of the subset of the set of media recordings.

16. The method of claim 1 wherein the information extracted from the media recordings of the subset of the set of media recordings includes a classification of one or more media recordings of the subset of the set of media recordings into one or more media recording categories.

17. The method of claim 1 wherein the information extracted from the media recordings of the subset of the set of media recordings includes a measure of a performance of a customer service agent associated with one or more of the media recordings of the subset of the set of media recordings.

18. The method of claim 1 wherein the information extracted from the media recordings of the subset of the set of media recordings includes speech analytics information.

19. The method of claim 1, wherein the quantity additionally represents a desired computation time.

20. The method of claim 1, wherein the quantity additionally represents the predicted accuracy of automatic speech recognition (ASR).

21. The method of claim 1, wherein the quantity additionally represents a predicted recall for the media recording.

22. The method of claim 1, wherein in a first processing stage, the selected subset includes no more than a predetermined fixed number of media recordings.

23. Software stored in a non-transitory form on a computer-readable medium, for analysis of a set of media recordings, the software comprising instructions for causing a computing system to:

in a first processing stage, select a subset of the set of media recordings by performing a first processing of each media recording of the set of media recordings; and in a second processing stage, perform a second processing of the subset of the set of media recordings, the second processing including extraction of information from the media recordings of the subset of the set of media recordings;

wherein the first processing of each media recording of the set of media recordings includes determining a quantity characterizing a predicted performance of the second processing of the media recording, wherein the quantity represents a predicted extraction speed when extracting information from the media recording.

24. A computing system for analysis of a set of media recordings, the computing system comprising:

at least one processor configured to process the set of media recordings, the processing including in a first processing stage, selecting a subset of the set of media recordings by performing a first processing of each media recording of the set of media recordings; and in a second processing stage, performing a second processing of the subset of the set of media recordings, the second processing including extraction of information from the media recordings of the subset of the set of media recordings;

wherein the first processing of each media recording of the set of media recordings includes determining a quantity characterizing a predicted performance of the second processing of the media recording, wherein the quantity represents a predicted extraction speed when extracting information from the media recording.

25. A method for analysis of a set of media recordings, the method comprising:

in a first processing stage, selecting a subset of the set of media recordings by performing a first processing of each media recording of the set of media recordings; and in a second processing stage, performing a second processing of the subset of the set of media recordings, the second processing including extraction of information from the media recordings of the subset of the set of media recordings;

wherein the first processing of each media recording of the set of media recordings includes determining a characterization of the media recording, the characterization including at least a quantity characterizing a predicted performance of the second processing of the media recording, wherein the quantity characterizing the predicted performance of the second processing of the media recording represents a predicted information extraction speed.

* * * * *